March 28, 1961   H. L. MUELLER   2,977,153
TIRE RIM
Filed Dec. 20, 1956   2 Sheets-Sheet 1

INVENTOR.
HOMER L. MUELLER
BY
Tennes J Enstad
Attorney

March 28, 1961  H. L. MUELLER  2,977,153
TIRE RIM

Filed Dec. 20, 1956  2 Sheets-Sheet 2

INVENTOR.
HOMER L. MUELLER
BY
Attorney

United States Patent Office 2,977,153
Patented Mar. 28, 1961

2,977,153
TIRE RIM

Homer L. Mueller, Rocky River, Ohio, assignor to American Machine and Foundry Company, a corporation of New Jersey Filed Dec. 20, 1956, Ser. No. 629,660

1 Claim. (Cl. 301—97)

This invention relates to wheels for pneumatic tires and to the method for making the same.

The rim design in the present invention is adaptable for use not only for bicycle wheels but is also applicable for automobile wheels as well.

Tubeless tires are presently used on automobiles and trucks but as far as known, tubeless bicycle tires have never been provided for use on bicycles. One of the reasons why tubeless tires could not be readily employed on bicycle wheels has been due to the fact that the air would escape past the spoke-tightening nipples which was not a problem in either the automobile or truck tire fields.

In the truck and automobile fields, the rim was made from an imperforate sheet of metal rolled into a circle of rim configuration and wherein only one hole for a valve stem was employed. Sealing this single hole against air leakage was a far simpler task than sealing the multitudinous spoke tightening nipple holes found in a bicycle rim.

Nevertheless, the advantages of a tubeless tire were well known and the need existed for such a tire which was not satisfied by the tube type tire currently employed and was not satisfied by the tubeless bicycle tire of several decades ago or the solid tire used prior to then. The tubeless tire of several decades ago had a disadvantage that it had to be glued to the rim by an adhesive, and if any slippage occurred between the tire and the rim, it would tear the valve stem from the tire. The balloon tube type tire that is in use today has the disadvantage that it is easily punctured and it is often difficult to locate a hole in a bicycle tube.

It was therefore necessary to provide a bicycle tire and rim which would overcome the disadvantages mentioned so as to enable bicycle users to enjoy the same advantages for their bicycles as was enjoyed by automobile and truck users employing tubeless tires.

In my copending application, S.N. 629,278, filed December 19, 1956, I showed a number of different ways for constructing a rim for tubeless tires. While these arrangements serve their purpose very satisfactorily, the present disclosure is considered a further improvement which not only provides a simplified rim and method for making the same, but also provides a rim which imparts a sports car appearance to a wheel.

It is an object of the present invention to provide a rim which will be of a simplified design, easy to construct and can be made in a continuous rolling operation.

It is an object of this invention to provide a rim which will have the advantages of being of a modern design bearing some resemblance to sports car wheels, and which will be easily assembled and trued.

A further object is to provide a rim in which bicycle spokes and nipples can be replaced without removing the tire.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Since there has been a need for an improved rim on which tubeless bicycle tires can be mounted, I will describe how my invention may be employed for making bicycle rims. It will be understood, however, that in applying my invention to a rim of bicycle design, the invention is nevertheless equally applicable to the automobile field and for that matter to any field where pneumatic tires are employed. A description of this invention being applied to one of these fields will be sufficient for anyone to practice the teaching of this disclosure in the automobile field or in other pneumatic tire fields employing rims.

Figure 1:
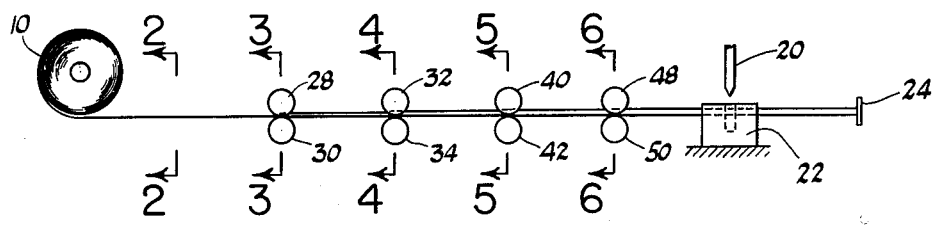
Fig. 1 is a side elevation of the shaping rollers and the strip metal continuously drawn from a coil and cut off in rim lengths.
Figure 6:
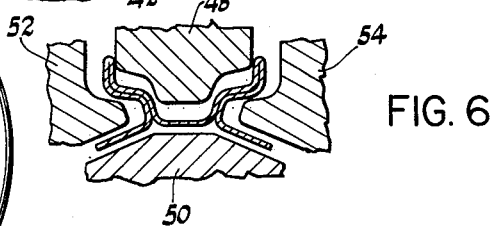
Fig. 6 is a cross-sectional end elevation taken on the line 6—6 of Fig. 1 showing the configuration imparted to the strip steel by a still more subsequent set of shaping rollers at a still further stage of the shaping operation.

I have diagramatically shown in Fig. 1 how strip steel is continuously removed from a roll 10 and forwarded through a series of shaping rollers which gradually impart to the strip steel the final shape shown in Fig. 6 in one continuous operation.

Since the number of shaping stages may be varied depending on the thickness, shape and kind of metal employed, I have for purposes of example shown only four sets of shaping rollers to show how the strip steel I have employed is gradually rolled to the cross sectional configuration desired. It will be appreciated however that more rollers and shaping stages will be employed in actual production to gradually achieve the configuration desired.

Male and female rollers having complementary peripheries, such as rollers 28, 30, 32, 34, 36, 38, 40, 42, 44, 46, 48, 50, 52, and 54, act on the strip steel progressively to impart the cross sectional configuration ultimately desired in a series of shaping operations. It will be appreciated in actual manufacture more stages than those shown will be employed to permit faster operation and more accurate control over the metal undergoing shaping.

After the strip steel has received the cross sectional configuration shown in Fig. 6 after passing through the rollers 48 and 50, it moves past a conventional cutter 20 and ledger plate 22 up to a stop and detector 24 shown in Fig. 1.

When the detector and stop 24 is contacted, it automatically causes the cutting knife 20 to descend across the ledger 22 severing a length of shaped rim material from the leading end of the strip steel.

After this severing operation, the severed section of shaped steel is removed automatically to permit the leading end of the continuous strip material to move past the cutter 20 up against the stop and detector 24 when the severing operation mentioned is repeated.

Figure 7:
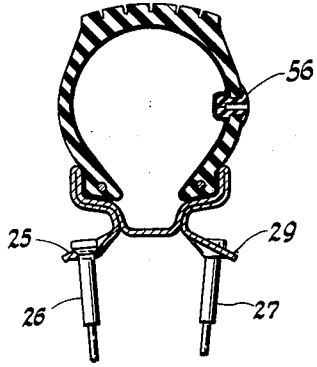
Fig. 7 shows a partial cross-sectional end elevation of a bicycle wheel showing a tubeless tire mounted on my improved rim and the exposed spoke nipples.
Figure 2:
Fig. 2 is a cross-sectional end elevation taken on the line 2—2 of Fig. 1 showing the strip metal prior to passing through a shaping roller.
Figure 3:
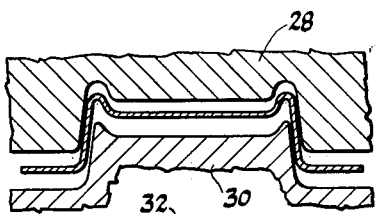
Fig. 3 is a cross-sectional end elevation taken on line 3—3 of Fig. 1 showing the configuration imparted to the strip steel by one set of shaping rollers at the beginning of the shaping operation.
Figure 4:
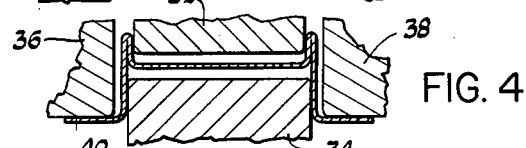
Fig. 4 is a cross-sectional end elevation taken on the line 4—4 of Fig. 1 showing the configuration imparted to the strip steel by a subsequent set of shaping rollers.
Figure 5:
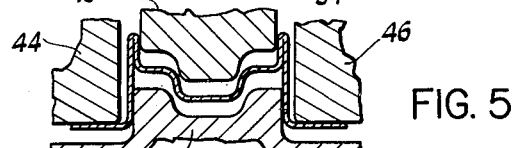
Fig. 5 is a cross sectional end elevation taken on the line 5—5 of Fig. 1 showing the configuration imparted to the strip steel by another set of shaping rollers at a further succeeding stage of the shaping operation.

It will be appreciated that while I have shown one way of imparting the configuration illustrated in Fig. 6 to the rim material, it would also be possible to impart this same configuration to sheet metal material by a series of pressing operations rather than by a rolling operation. In either event, the important factor is that a rim section be formed which has an imperforate surface on which a tubeless tire may be mounted and which has flanges 25 and 29 formed on the lower or upper side of the rim. These flanges 25 and 29 may be arranged in any position on the outside of the rim and at a lower or higher position shown and may face at any desired angle relative to the rim. These flanges are perforated at regular intervals, which may be depressed to receive the head of spoke nipples 26 and 27 inserted therein into which spokes are threaded in a manner well known in the bicycle field. The particular configuration which is clearly illustrated in Fig. 7 has the advantage that a broken spoke may be readily removed and replaced without requiring the tire to be romoved.

The conventional lacing and truing operation employed in manufacturing bicycle wheels can be readily followed in the rim herein disclosed. The tubeless bicycle tire illustrated can be inflated by employing a conventional inflating valve stem (not shown) which is mounted in a hole formed in the trough of the rim or the tubeless tire may be provided with a rubber self sealing inflating valve extending through the sidewall of the tire which may be similar in construction to the valve described in U.S. Patent 2,183,900. To inflate the tire, a hollow needle is inserted through the valve plug 56 to discharge air into the center core of the tire to the pressure desired and when the needle is withdrawn, the hole automatically seals itself.

The formation and method of forming the rim structure disclosed will be readily apparent from an inspection of the drawings.

In the initial forming stages oppositely disposed rollers 28 and 30 commence forming the trough, the bead flanges and the nipple supporting flanges.

After the initial forming operation the metal passes between rollers 32 and 34 where the trough and bead flanges are made more pronounced. Simultaneously, the side rollers 36 and 38 press the material up against the sides of rollers 32 and 34.

The partially shaped strip material then passes between rollers 40 and 42 where the bead seats are formed and the bead flanges and center trough become still more pronounced. Here again side rollers 44 and 46 are employed to press the sides of the strip steel up against rollers 40 and 42.

At a still more remote stage the partially shaped strip steel then passes between rollers 48 and 50 which together with side rollers 52 and 54 cooperating therewith impart the desired final configuration.

Figure 8:
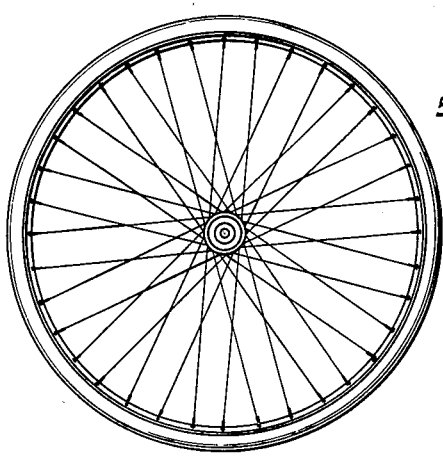
Fig. 8 is a side elevation of a bicycle wheel embodying the features of the present invention.

After the strip steel leaves the final separating rollers it is severed into proper length, curled into a circle, and butt-welded to form a rim which is then laced and a tubeless tire is mounted thereon in the manner shown in Fig. 8. It will be appreciated that while I have described a tubeless tire, a tube type tire could likewise be mounted on this rim.

Figure 9:
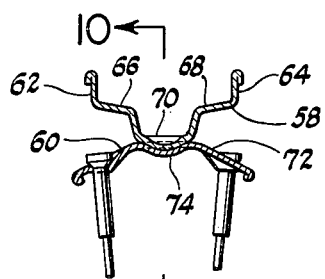
Fig. 9 is a cross-sectional end elevation of a modified form of my rim.
Figure 10:
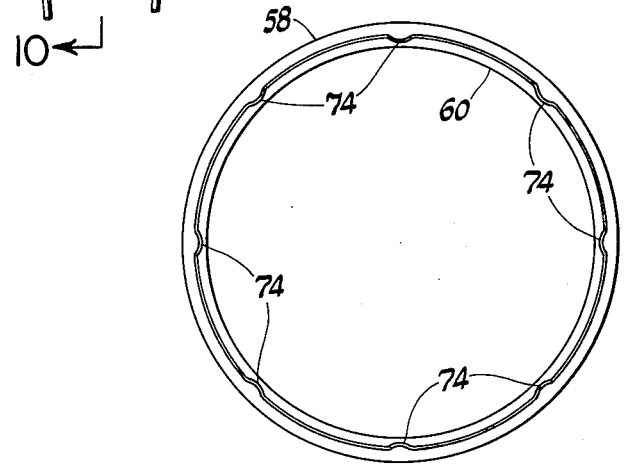
Fig. 10 is a side view, taken on line 10—10 of Fig. 9.

Instead of employing the continuous rolling process described in Figs. 1 to 6, the advantages of applicant's improved rim could be obtained by means of the structure shown in Figs. 9 and 10. In this embodiment, the outer rim 58 may be formed in any suitable rolling mill or press to form the configuration shown wherein the rim is provided with side flanges 62 and 64, bead seats 66 and 68 and a trough 70.

An inner rim 60 having a crowned circumference 72 is also formed by a similar process wherein a strip of sheet metal of a predetermined length is butt-welded to form a band and a crown imparted thereto either before or after formation into a hoop. The diameter of the hoop is smaller than the inside diameter of the trough 70 so that the outer rim 58 and the inner rim 60 may be concentrically arranged after which they are both fixedly secured to one another, either by welding or by forming suitable indentations 74 at the point where the inner rim and outer rim areas are contiguous with each other.

Fig. 10 shows how these indentations are uniformly arranged around the contiguous surfaces of the outer and inner rims 58 and 60. This particular arrangement of having a flange project outwardly from opposite sides of the rim enables the spoke nipples to be readily replaced after the rim has been completely formed and constructed without necessitating the removal of a tire to effect the replacement of the spokes. Also, because the outer rim 58 does not have any perforations formed therein, a tubeless tire may be mounted so that the beads thereof seat themselves on the bead seats 66 and 68 and move outwardly until they engage with the side flanges 62 and 64, thereby providing an air tight seal between the beads and the respective bead engaging portions of the outer rim.

In the various embodiments described, the spokes and nipples may be replaced without having to demount the tubeless tire to effect such a replacement. The flanges 25, 29 and 86, 88 may be arranged to extend radially outwardly in a direction which either faces towards the axis of the top of the bicycle wheel or in a direction away from the axis of the hub of the bicycle wheel. In either case, suitable indentations may be formed in each of the nipple receiving perforations to receive the head of a spoke nipple.

In the latter embodiment, as in the embodiments previously described, the spokes and nipples may be replaced without having to demount the tubeless tire to effect such a replacement, regardless of whether the nipple flanges 25, 29 and 86, 88 extend either straight out or face towards or away from the axis of the hub of the bicycle wheel. Since in this instance also the bicycle wheel rim does not have any perforated surfaces, there is no problem of air leaking out through the nipple openings.

The invention hereinabove described may be varied in construction within the scope of the claim, for the particular device selected to illustrate the invention is but one of many possible embodiments of the same. The invention, therefore, is not to be restricted to the precise details of the structure shown and described.

What is claimed is:

A sheet metal rim for a bicycle spoke wheel for an inflatable tubeless tire, said rim having a concave trough section, a pair of annular bead seats, each of said bead seats being inclined radially outwardly relative to the rim axis and having an inner and an outer edge, the inner edge of each of said bead seats being integral with one side of said trough section, respectively, parallel bead engaging flanges projecting radially from the outer edges of said bead seats and away from the hub of said spoke wheel to provide bead engaging flanges for an inflatable tubeless tire mounted on said rim, an extension of each said flange being doubled back on itself into contiguous contact with the outside of said flange bead seats and the sides of said trough to strengthen the same, and nipple supporting flanges formed from said doubled back metal and extending axially outwardly from the sides of said trough to provide an external nipple support for the spokes of a spoke wheel.

(References on following page)

References Cited in the file of this patent

UNITED STATES PATENTS

| | | | |
|---|---|---|---|
| 365,091 | Owen | June 22, | 1887 |
| 397,189 | Jeffery | Feb. 5, | 1889 |
| 582,486 | Rowe | May 11, | 1897 |
| 1,280,715 | Goodyear | Oct. 8, | 1918 |
| 1,551,445 | Wagenhorst | Aug. 25, | 1925 |
| 1,652,146 | Michelin | Dec. 6, | 1927 |
| 1,664,765 | Ash | Apr. 3, | 1928 |
| 2,587,470 | Herzegh | Feb. 26, | 1952 |

FOREIGN PATENTS

| | | | |
|---|---|---|---|
| 108,571 | Austria | Jan. 10, | 1928 |